(12) United States Patent
Wiesner

(10) Patent No.: US 9,427,888 B2
(45) Date of Patent: Aug. 30, 2016

(54) METHOD FOR RESUMING A WIRE SAWING PROCESS OF A WORKPIECE AFTER AN UNPLANNED INTERRUPTION

(71) Applicant: Siltronic AG, Munich (DE)

(72) Inventor: Peter Wiesner, Reut (DE)

(73) Assignee: SILTRONIC AG, Munich (DE)

( * ) Notice: Subject to any disclaimer, the term of this patent is extended or adjusted under 35 U.S.C. 154(b) by 474 days.

(21) Appl. No.: 14/087,163

(22) Filed: Nov. 22, 2013

(65) Prior Publication Data

US 2014/0144420 A1 May 29, 2014

(30) Foreign Application Priority Data

Nov. 29, 2012 (DE) ........................ 10 2012 221 904

(51) Int. Cl.
*B28D 5/04* (2006.01)
*B23D 57/00* (2006.01)
*B28D 1/08* (2006.01)

(52) U.S. Cl.
CPC ........... *B28D 5/045* (2013.01); *B23D 57/0023* (2013.01); *B28D 1/08* (2013.01)

(58) Field of Classification Search
CPC .......... B23D 57/0007; B23D 57/0023; B23D 61/18; B28D 1/06; B28D 1/08; B28D 5/04; B28D 5/045
USPC ........ 125/16.01, 16.02, 21; 438/33, 68, 113, 438/460–465
See application file for complete search history.

(56) References Cited

U.S. PATENT DOCUMENTS

| | | | |
|---|---|---|---|
| 4,655,191 A | 4/1987 | Wells et al. | |
| 5,052,366 A | 10/1991 | Matsukura | |
| 5,226,403 A * | 7/1993 | Toyama | B23D 59/001 125/13.01 |
| 5,287,774 A | 2/1994 | Seifert | |
| 5,771,876 A | 6/1998 | Egglhuber | |
| 5,810,643 A * | 9/1998 | Toyama | B23D 57/0046 125/21 |
| 5,893,308 A | 4/1999 | Katamachi et al. | |
| 8,037,878 B2 | 10/2011 | Kitagawa et al. | |
| 2006/0258268 A1 * | 11/2006 | Miyata | B28D 5/045 451/41 |
| 2010/0089377 A1 | 4/2010 | Oishi et al. | |

(Continued)

FOREIGN PATENT DOCUMENTS

| | | |
|---|---|---|
| CN | 102791426 A | 11/2012 |
| DE | 3940691 A1 | 6/1991 |
| DE | 19517107 C2 | 11/1995 |
| DE | 10147634 B4 | 7/2004 |
| DE | 112008003321 T5 | 12/2010 |
| DE | 102011008397 A1 | 7/2011 |

(Continued)

*Primary Examiner* — Moshe Wilensky
*Assistant Examiner* — Marcel Dion
(74) *Attorney, Agent, or Firm* — Leydig, Voit & Mayer, Ltd.

(57) ABSTRACT

A method resumes an interrupted process for sawing a workpiece into wafers using a wire saw that includes advancing a wire web into existing sawing kerfs of the workpiece with a forward movement of the sawing wire with a first speed in the presence of a liquid sawing medium until the wire web or workpiece has reached a position corresponding to the interruption of the wire sawing process. The sawing wire is moved in defined time intervals by a forward movement of a particular length with a second speed and a backward movement of another length with a third speed, where the backward length is less than the forward length and the forward and backward movement correspond to a cycle. The wire length that is unwound during the forward movements is increased until the length during the forward movement corresponds to the length of the forward movement before the interruption.

9 Claims, 3 Drawing Sheets

(56) References Cited

U.S. PATENT DOCUMENTS

| | | |
|---|---|---|
| 2010/0163010 A1 | 7/2010 | Kitagawa |
| 2010/0206285 A1 | 8/2010 | Kitagawa |
| 2011/0088678 A1 | 4/2011 | Kitagawa |
| 2012/0298090 A1 | 11/2012 | Ohya et al. |
| 2014/0000580 A1* | 1/2014 | Kitagawa ............... B28D 5/045 125/21 |
| 2015/0202700 A1* | 7/2015 | Kondo .................. B28D 5/045 125/16.01 |
| 2015/0328800 A1* | 11/2015 | Uchiyama ............. B28D 5/045 125/21 |

FOREIGN PATENT DOCUMENTS

| | | |
|---|---|---|
| DE | 112009001747 T5 | 9/2011 |
| EP | 0522542 A1 | 1/1993 |
| EP | 1717001 B1 | 11/2006 |
| JP | 10006202 A | 1/1998 |
| JP | 2012223862 A1 | 11/2012 |
| TW | 200935507 A | 8/2009 |
| TW | 201223669 A | 6/2012 |
| WO | WO 2011151022 A1 | 12/2011 |
| WO | WO 2012089243 A1 | 7/2012 |

* cited by examiner

Wafer surface

Wafer surface

METHOD FOR RESUMING A WIRE SAWING PROCESS OF A WORKPIECE AFTER AN UNPLANNED INTERRUPTION

CROSS REFERENCE TO RELATED APPLICATIONS

This application claims priority from German Patent Application No. DE 10 2012 221 904.8, filed Nov. 29, 2012, which is hereby incorporated by reference herein in its entirety.

FIELD

The present invention relates to a method for resuming an interrupted process for sawing a workpiece into a multiplicity of wafers with a wire saw.

BACKGROUND

For electronics, microelectronics and micro-electromechanics, semiconductor wafers with extreme requirements for global and local planarity, one-side referenced local planarity (nanotopology), roughness and cleanness are needed as starting materials (substrates). Semiconductor wafers are wafers of semiconductor materials, in particular compound semiconductors such as gallium arsenide and predominantly elementary semiconductors such as silicon and sometimes germanium.

According to the prior art, semiconductor wafers are produced in a multiplicity of successive process steps: in a first step, for example, a single crystal (rod) of semiconductor material is pulled by the Czochralski method or a polycrystalline block of semiconductor material is cast, and in a further step the resulting circular-cylindrical or block-shaped workpiece of semiconductor material (ingot) is cut into individual semiconductor wafers by wire sawing.

Wire saws are used in order to cut a multiplicity of wafers from a workpiece made of semiconductor material. DE 195 17 107 C2 and U.S. Pat. No. 5,771,876 describe the functional principle of a wire saw which is suitable for the production of semiconductor wafers. The essential components of these wire saws include a machine frame, a forward feed device and a sawing tool, which consists of a web (wire web) of parallel wire sections. The spacing of the wires in the wire web depends on the desired target thickness of the wafers to be cut, and for semiconductor material wafers is for example from 100 to 1000 µm.

DE 101 47 634 B4 describes a method for cutting wafers of semiconductor material from a single crystal, the single crystal being rotated about a longitudinal axis during the cutting of the semiconductor wafers while penetrating into the sawing wires of two wire webs of a wire saw, the sawn wafers of semiconductor material having parallel rotationally symmetrical curved sides.

In general, the wire web is formed by a multiplicity of parallel wire sections which are tensioned between at least two wire guide rollers, the wire guide rollers being rotatably mounted and at least one of them being a driven roll.

The wire sections may belong to a single finite wire, which is guided spirally around the system of rollers and is unwound from a stock spool onto a receiver spool. Patent specification U.S. Pat. No. 4,655,191, on the other hand, discloses a wire saw in which a multiplicity of finite wires are provided and each wire section of the wire web is assigned to one of these wires. EP 522 542 A1 also discloses a wire saw in which a multiplicity of endless wire loops run around the system of wire-guide rollers.

During the cutting process, the workpiece passes through the wire web, in which the sawing wire is arranged in the form of wire sections lying parallel to one another. The passage through the wire web is brought about by means of a forward feed device, which moves the workpiece against the wire web, the wire web against the workpiece or the workpiece and the wire web against one another.

When the wire web penetrates into the workpiece, according to the prior art, for a defined time and with a particular speed, a defined length of the sawing wire is fed forward (wire forward) and a further defined length is fed back (wire backward), the backward length WBL generally being shorter than the forward length (WFL). This sawing method is also referred to as a reciprocating movement method and is disclosed, for example, in DE 39 40 691 A1 and in US 2010 1630 10 A2.

EP 1 717 001 B1 teaches that a forward movement and a backward movement are carried out when sawing a workpiece with a wire saw, the length of the wire during the backward movement (WBL) being shorter than the length of the wire during the forward movement (WFL).

DE 11 2008 003 321 T5 discloses, for removal of the wire web from a sawn workpiece, a wire running length in the forward and backward directions respectively of 1 m or less and a wire running speed of 2 m/min or less.

The sawing of a workpiece into many wafers with a wire saw is carried out in the presence of a liquid cutting medium, which inter alia is used to transport the material abraded by the sawing wire out of the sawing kerf, and according to the prior art is applied onto the sawing wire.

If the sawing wire is covered with an abrasive coating, for example diamond, a cutting medium without free abrasive is generally used. When using wire saws comprising a sawing wire without fixedly bonded abrasive, the abrasive is supplied in the form of a suspension (cutting medium suspension, sawing slurry, slurry) during the cutting process.

When cutting wafers from a workpiece made of semiconductor material, it is conventional for the workpiece to be connected to a sawing strip into which the sawing wire cuts at the end of the process. The sawing strip is for example a graphite strip, which is adhesively bonded or cemented on the lateral face of the workpiece. The workpiece with the sawing strip is then cemented on a support body. After the cutting, the resulting semiconductor wafers remain fixed on the sawing strip like the teeth of a comb, and can thus be removed from the wire saw. Subsequently, the remaining sawing strip is separated from the semiconductor wafers.

The production of semiconductor wafers from workpieces made of semiconductor material, for example from a circular-cylindrical rod of a single crystal or a cuboid polycrystalline block, places great demands on the wire sawing. The aim of the sawing process is generally for each sawn semiconductor wafer to have side faces which are as planar as possible and lie parallel to one another.

Deviations from the ideal wafer shape are described, inter alia, by the parameters warp and bow.

The so-called warp of the wafers is a known measure of the deviation of the actual wafer shape from the desired ideal shape. The warp should generally amount to at most a few micrometers (µm).

The bow is a measure of the convex or concave deformation of a wafer and should in general be at most a few micrometers (µm).

The warp and bow of the wafers are essentially caused by a relative movement of the sawing wire sections relative to the workpiece, which takes place in the axial direction with respect to the workpiece in the course of the sawing process. This relative movement may for example be the result of cutting forces which occur during the sawing, axial displacements of the wire guide rollers due to thermal expansion, bearing plays or thermal expansion of the workpiece.

US application US 2010/0089377A1 teaches a method for cutting a multiplicity of wafers from a workpiece, in which the warp and the bow of the wafers are reduced. To this end, the displacements of the workpiece and of the wire web in the axial direction are respectively measured and correspondingly adapted.

During the cutting of wafers from a workpiece, strong mechanical and thermal loading of the sawing wire in the wire web occurs, which can lead to unplanned interruption of the wire sawing process due to wire breaking (wire fracture).

In order to avoid wire breakages when cutting a workpiece into a multiplicity of wafers by means of a wire web, laid-open specification DE 10 2011 008 397 A1 teaches the application of a torque detection device on the stationary axle of a deflection pulley, so that an excessively large tensile stress applied to the sawing wire can be avoided.

In the event of a wire breakage, the sawing process must be interrupted as rapidly as possible in order to avoid damage to the wire saw and the material to be cut.

In order to be able to identify a wire breakage immediately and to be able to stop the wire saw process within the shortest possible time, WO 2011/151022 A1 discloses a method for monitoring wire breakages when cutting a workpiece by means of wire webs, in which a direct current is passed through the wire web and generates a voltage, which is monitored by a sensor, over the wire array. In the event of a voltage deviation caused by a wire breakage, the cutting process is interrupted automatically.

After a wire breakage and switching off of the wire saw, the workpiece and the wire web are separated from one another. To this end, for example, the workpiece may be removed upward from the web. After repair, the workpiece is reintroduced into the wire web, optionally with minor movement of the sawing wires in the presence of the cutting medium.

The interruption of the wire sawing process should be as brief as possible, since the sawing wires and guide rolls heated by the cutting into the workpiece cool during shutdown and contraction of the sawing wires and guide rolls may occur. This may lead to impaired nanotopography of the wafer surfaces on resumption of the sawing process.

In order to avoid contraction of the heated sawing wires and guide rolls on unplanned shutdown, publication DE 11 2009 001 747 T5 discloses a method for resuming operation of a wire saw, in which, during the unplanned shutdown, thermal regulation of the workpiece and of the relevant parts of the wire saw (sawing wire and guide rolls) is ensured by the liquid cutting medium. In addition, a displacement magnitude for the guide rolls of the wire web, which corresponds to the displacement of the workpiece on interruption of the process, is set in the axial direction.

For resuming the sawing process, however, the teaching of publication DE 11 2009 001 747 T5 does not take into account the fact that the sawing wire has at least partially a different degree of wear after repair than before the interruption. A different degree of wire wear results in a different diameter of the wire.

For this reason, a deep incision (groove, indentation) may occur in the surface of the wafers to be cut when resuming the wire sawing process, so that in the least favorable case the wafers are no longer suitable for further processing owing to the inferior surface topography. It is this problem which gives rise to the object of the present invention.

SUMMARY

In an embodiment, the present invention provides a method for resuming an interrupted process for sawing a workpiece into a multiplicity of wafers using a wire saw. The wire saw includes a sawing wire which spans a wire web including a plurality of wire sections arranged in parallel. The sawing wire is unwound from a feed spool with a forward movement and guided over at least one rotatable deflection pulley into the wire web, leaves the wire web via at least one further rotatable deflection pulley, and is wound onto a take-up spool. The interrupted process, before the interruption, includes alternately moving the sawing wire in defined time intervals forward by a first length L1 and backward by a second length L2. The method for resuming the interrupted process includes advancing the wire web into existing sawing kerfs of the workpiece with a forward movement of the sawing wire with a first speed v1 and in the presence of a liquid sawing medium until the wire web or workpiece has reached a position corresponding to the interruption of the wire sawing process and the sawing wire comes to a stop. The sawing wire is moved in defined time intervals by a forward movement having a third length L3 with a speed v and a backward movement having a fourth length L4 with a speed v', where the fourth length L4 is less than the third length L3 and the forward and backward movement corresponding to a cycle. The wire length that is unwound is increased during the forward movement until the third length L3 corresponds to the first length L1 of the forward movement before the interruption.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
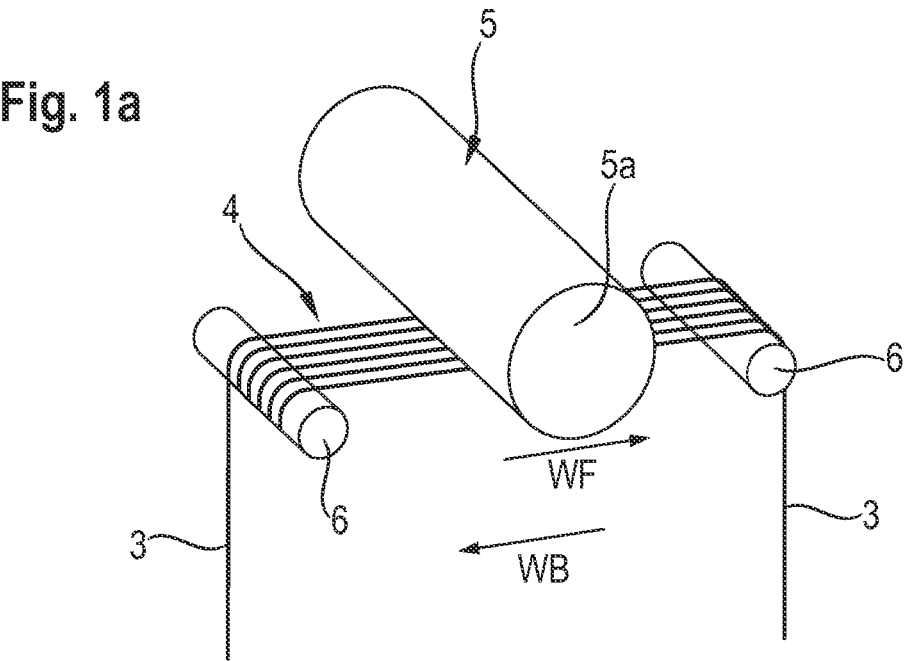
FIG. 1a schematically shows the structure of a wire saw for sawing a circular-cylindrical workpiece.

The method according to the invention is explained below with reference to the example of a process for sawing a workpiece of semiconductor material into a multiplicity of wafers with a wire saw, although it is also suitable for workpieces of other materials.

In an embodiment, the present invention provides a method which, in the event of an unplanned process interruption during the wire sawing of a workpiece of semiconductor material, avoids negative effects on the surface topography of the sawn wafers of semiconductor material when resuming the process.

In an embodiment, the present invention provides a method for resuming an interrupted process for sawing a workpiece 5 into a multiplicity of wafers with a wire saw, comprising a sawing wire 3 which spans a wire web 4 consisting of many wire sections arranged parallel, the sawing wire 3 is unwound from a feed spool 1a with a forward movement and guided over at least one rotatable deflection pulley 2 into the wire web 4, leaves the wire web 4 again via at least one further rotatable deflection pulley 2, is wound onto a take-up spool 1b and, before the interruption, the sawing wire 3 is moved alternately in defined time intervals forward by a length L1 and backward by a length L2; in order to resume the interrupted process, the wire web 4 penetrates by forward movement with a first speed v1 of the sawing wire 3 into the existing sawing kerfs of the workpiece 5 with the addition of a liquid sawing medium of the sawing wire 3 until the wire web 4, or the workpiece 5, has reached the position of the interruption of the wire sawing process, and the sawing wire 3 comes to a stop, wherein, when resuming the sawing process, the wire 3 is moved alternately in defined time intervals forward by a length L3 with a speed v and backward by a length L4 with a speed v', L4 being less than L3 and a forward movement and a backward movement corresponding to a cycle Z, and during each forward movement, every other forward movement or after an arbitrary number of forward movements the wire length L3 unwound during the forward movement is increased, until the wire length L3 corresponds to the wire length L1 of the forward movement before the interruption.

A workpiece is a geometrical body having a surface consisting of at least two parallel plane faces (end faces) and a lateral face, which is formed by parallel straight lines. In the case of a circular-cylindrical body, the end faces are circular areas and the lateral face is convex. In the case of a cuboid cylindrical workpiece, the lateral face is planar.

Although the present invention relates primarily to workpieces of semiconductor material, it is nevertheless usable for sawing a workpiece of any desired material with a wire saw.

A workpiece of semiconductor material is a single crystal or a crystal of semiconductor material, the semiconductor material usually being silicon.

The semiconductor material wafers sawn from the workpiece of semiconductor material have a front side and a rear side, as well as a circumferential edge, and are refined in further processing steps.

Figure 1B:
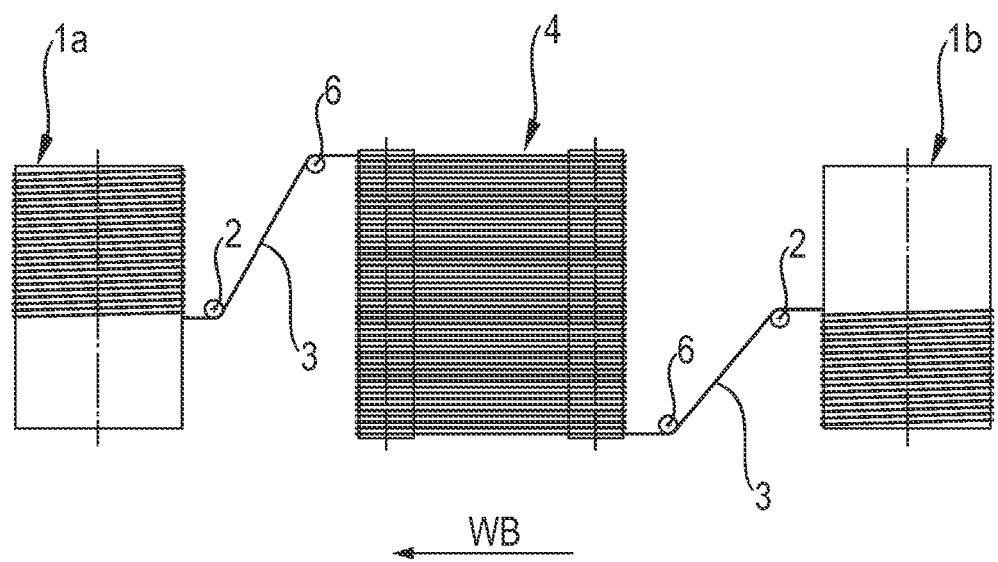
FIG. 1b shows the wire for a wire web being fed from a feed spool to a take-up spool.

FIG. 1 shows, in a highly simplified way, the structure of a wire saw for sawing a circular-cylindrical workpiece 5 according to the prior art. The sawing wire 3 is guided from a feed spool 1a via at least one deflection pulley 2 into a wire web 4. The wire web 4 consists of a multiplicity of wire sections, which are arranged parallel and penetrate into the workpiece 5 during the sawing process (FIG. 1a). The wire fed out of the wire web 4 is wound via at least one further deflection pulley 2 onto a take-up spool 1b (FIG. 1b) (wire forward, WF). When the sawing wire 3 is wound back (wire backward, WB), the take-up spool 1b becomes the feed spool 1a and the feed spool 1a becomes the take-up spool 1b in the wire forward step.

Figure 2A:
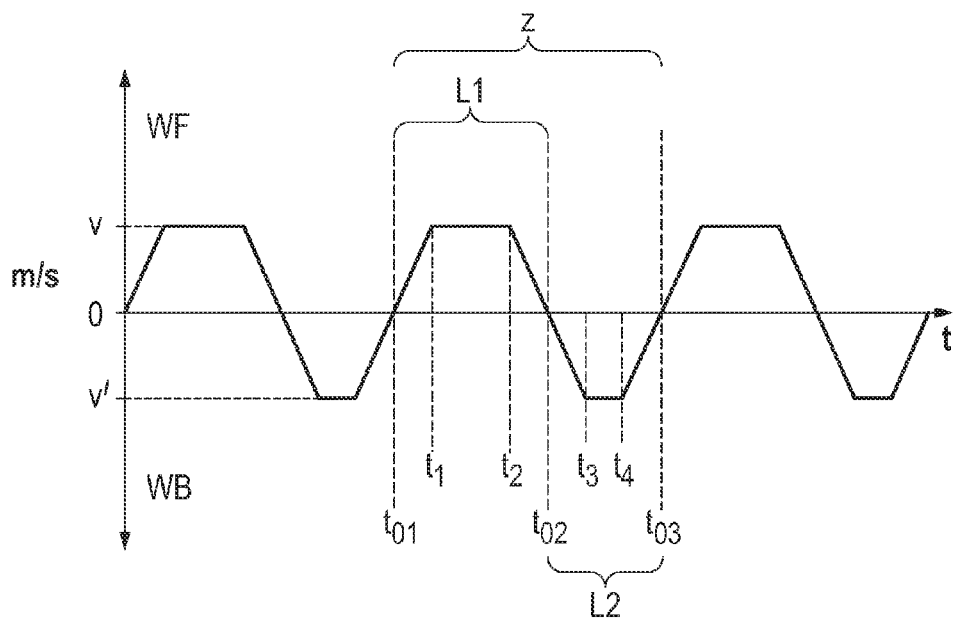
FIG. 2a shows wire speed as a function of time in an embodiment of a sawing method.

FIG. 2a shows the wire speeds v (m/s) for the oscillation (forward and backward movement) of the sawing wire 3 as a function of time t during the wire sawing process according to the reciprocating movement method. A cycle Z of the wire oscillation in this case comprises the period of acceleration of the sawing wire at the start of the forward movement (wire forward) at time t01 until the end of the backward movement directly following on from the forward movement of the wire, at time t03. Accordingly, a cycle Z is composed of a forward movement phase (wire forward, WF) and a backward movement phase (wire backward, WB).

Figure 2B:
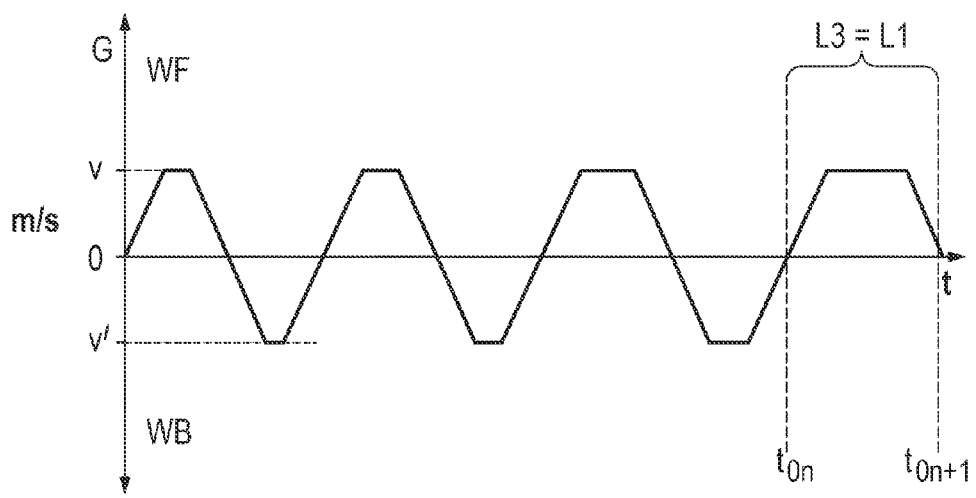
FIG. 2b shows wire speed as a function of time in an embodiment of resuming a sawing method.

FIG. 2b shows the wire oscillation in the reciprocating movement method according to the invention for resuming a wire sawing process after an unplanned shutdown. The wire length L3 unwound from the feed spool 1a in the forward direction (WF) becomes longer in each cycle until L3 is equal to L1. In the embodiment shown here by way of example, the wire length L4 wound back from the take-up spool 1b in the backward direction (WB) becomes longer in each cycle until L4 is equal to L2, L4 being shorter than L3 (not shown).

Figure 3A:
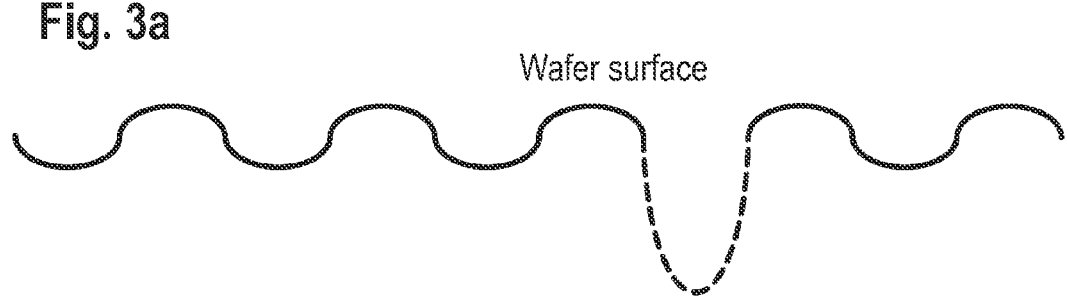
FIG. 3a shows an embodiment of a groove resulting from an unplanned shutdown in a sawing process.
Figure 3B:
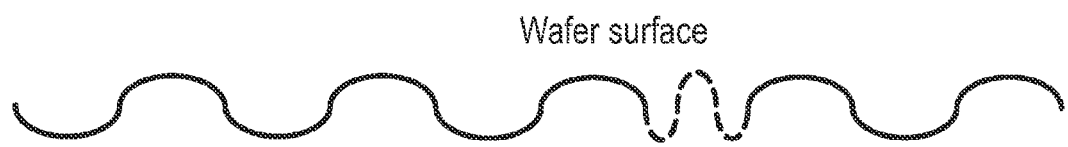
FIG. 3b shows another embodiment of a groove resulting from an unplanned shutdown in a sawing process.

FIG. 3 schematically shows the profile of the surface of a semiconductor material wafer sawn from a workpiece 5. The deep groove in FIG. 3a is a result of the resumption of a wire sawing process after an unplanned shutdown according to the prior art. FIG. 3b shows the profile which results from the resumption of a wire sawing process after an unplanned shutdown with the method according to the invention.

In the method according to the invention, a conventional wire saw is used. The workpiece 5 to be sawn is generally fixed on a sawing strip, which is clamped with a mounting plate in the wire saw. The sawing of the workpiece is carried out with a wire web 3.

The wire web 3 of the wire saw is formed by a multiplicity of parallel wire sections which are tensioned between at least two (and optionally three, four or more) wire guide rollers 6, the wire guide rollers 6 being mounted rotatably and at least one of the wire guide rollers 6 being driven. The wire sections generally belong to a single finite wire 3, which is guided spirally around the system of rollers and is unwound from a feed spool (wire-stock spool) 1a onto a take-up spool (receiver spool) 1b (FIG. 1a).

The sawing, or penetration, of the wire web 4 into the workpiece 5 is carried out with a forward feed device, which moves the workpiece 5 against the wire web 4, the wire web 4 against the workpiece 5 or the workpiece 5 and the wire web 4 against one another (cutting movement). At the same time the sawing wire 3 is wound from a feed spool 1a via the wire web 4 onto a take-up spool 1b (FIG. 1b).

A liquid cutting medium is preferably applied to the wire sections of the wire web 4 by means of nozzles (not shown).

Both wire saws in which the sawing wire in the wire web contains fixedly bonded abrasives, for example diamond abrasive or silicon carbide, and wire saws in which the sawing wire does not have an abrasive coating and the cutting power is provided by a cutting suspension containing abrasives, which is applied onto the sawing wire during or before the sawing process, are suitable for the method according to the invention.

All liquid media according to the prior art are suitable as cutting media. Preferably, glycol, oil or water is used as a carrier material and silicon carbide as abrasive.

The workpiece 5 to be sawn is fastened by means of a sawing strip on a holding device (not shown) in such a way that the end faces 5a are aligned parallel with the wire sections of the wire web 4. During the sawing process, the forward feed device induces a mutually directed relative movement of the wire sections and the workpiece 5. As a consequence of this forward feed movement, the wire 3, to which a cutting medium is applied, works by material erosion through the workpiece 5 to form parallel sawing kerfs, with a comb resulting from the wafers being formed.

The wire sawing of semiconductor material workpieces is preferably carried out according to the so-called reciprocating movement method (wire oscillation method, pilgrim step motion method), that is to say the sawing wire is moved alternately forward and backward in the wire web by a suitable drive, with a forward movement phase WF1, comprising an acceleration phase, a defined time period with a constant speed v of the sawing wire 3 and a deceleration phase until the sawing wire comes to a stop, and a backward movement phase WB2, comprising an acceleration phase in the opposite direction, a defined time period with a constant speed v' of the sawing wire 3 in the opposite direction and a deceleration phase until the sawing wire comes to a stop, corresponding to a cycle Z (FIG. 2a).

From time t01 to time t1, the sawing wire 3 is accelerated in the forward direction (WF) until the speed v is reached. The sawing wire 3 is moved forward in the time interval $t_1$ to $t_2$ with a defined and constant speed v. In the time period $t_2$ to $t_{02}$, the forward speed is reduced to 0 m/s (FIG. 2a).

From time t02, the speed of the sawing wire 3 in the backward direction (WB) is accelerated to a speed v' until time t3, the backward movement of the sawing wire 3 taking place with the constant speed v' until time t4. In the time period t4 to t03, the backward speed is reduced to 0 m/s (FIG. 2a).

The speed v or v', respectively, of the sawing wire is preferably 5-20 meters per second (hereafter m/s), particularly preferably 10-15 m/s.

While the wire 3 is being moved in the forward direction in the time interval $t_{01}$ to $t_{02}$ (=WF1), a wire length L1 is unwound from the feed spool 1a and a corresponding wire length L1 is wound onto the take-up spool 1b.

In the time period $t_{02}$ to $t_{03}$ (=WB2), in which the wire 3 is moved in the backward direction, a wire length L2 is unwound again from the take-up spool 1b and a corresponding wire length L2 is wound back onto the feed spool 1a, with L2<L1.

The length L1 is preferably from 200 m to 500 m, particularly preferably from 300 m to 400 m.

The length L2 preferably corresponds to from 30% to 90% of the length L1.

Since L2 is shorter than L1, with each sawing cycle Z a defined length L(new) (L(new)=L1 minus L2) of fresh wire is fed into the wire web 4 in order to minimize the wire wear.

The time period for a cycle Z (=WF1+WB2) is constant throughout the wire sawing process.

If a wire breakage or another unplanned event, for example an electrical or mechanical fault, now leads to an interruption of the wire sawing process, the wire sawing process consisting of the wire drive and the cutting movement is automatically terminated and the wire saw is brought to a stop in a controlled way within a few seconds after the wire breakage or the other unplanned event.

The signal for terminating the sawing process is triggered automatically by at least one monitoring device internal to the system. A monitoring device may, for example, consist of electrical wire breakage monitoring or a ground short circuit signal.

The ground short circuit signal is triggered by contact of the broken sawing wire with a metal surface.

In the case of a wire breakage, the broken wire is removed manually from the workpiece if necessary.

After an unplanned interruption of the wire sawing process, the workpiece 5 is removed from the wire web 4.

The resumption of the wire sawing process takes place after repair or optionally replacement of the sawing wire 3 or the resolution of another fault.

The resumption of an interrupted wire sawing process begins with introduction of the wire web 4 into the already existing sawing kerfs in the workpiece 5. The sawing wire is in this case preferably wound with a low speed v1, preferably 0.1-0.5 m/s, in the "wire forward" direction from the feed spool through the wire web onto a take-up spool, and the wire web 4, formed by the wire sections arranged parallel, is reintroduced into the workpiece 5 in the presence of the cutting medium until the position at the time of the interruption is reached.

When the wire web 4, or the workpiece 5 to be sawn, has again reached the position at the time of the interruption, i.e. the wire sections of the wire web 4 have reached the upper end of the respective sawing kerfs, the wire introduction process is ended and the forward winding of the sawing wire is stopped (wire speed 0 m/s).

In another embodiment, when the wire web 4, or the workpiece 5 to be sawn, has again reached the position at the time of the interruption, the resumption of the wire sawing process is started without stopping the forward winding of the sawing wire.

The resumption of the wire sawing process after an unplanned interruption is preferably carried out in the "wire forward" direction, since in this way little used sawing wire 3 enters the already existing sawing kerfs in the workpiece 5 via the wire web 4 from the stock spool.

If the wire sawing process is started after the unplanned interruption immediately with the same wire oscillation, that is to say the same ratio of the wire lengths L1 (wire forward) to L2 (wire backward) as before the unplanned interruption, the formation of saw incisions (grooves) on the surfaces of the wafers sawn from the workpiece 5 occurs owing to the different degree of wear of the sawing wire 3 before and after the unplanned interruption. The depth of the saw incisions in the wafer surface may then locally be several times deeper (FIG. 3a), so that the minimum sawing thickness of the sawn wafer may not be attained.

With the method according to the invention for resuming an interrupted wire sawing process, the depth of the saw incisions due to the different degree of wear of the sawing wire 3 before and after the unplanned interruption on the surfaces of the wafers sawn from the workpiece is minimized (FIG. 3b), which has a positive effect on the minimum sawing thickness of the wafers sawn from the workpiece.

The method according to the invention is characterized by a special wire oscillation, that is to say a movement of the sawing wire through the workpiece by a length L3 which is initially not equal to the length L1 in one direction (wire forward, WF3) and a length L4 which is equal to or initially not equal to the length L2 in the other direction (wire backward, WB4).

In the wire forward phase WF3 of the cycle Z in the method according to the invention, the wire length L3 at the start of the resumption of the wire sawing process, that is to say in the first cycle or cycles, is less than 95% of the wire length L1 of the forward movement phase WF1 of the regular wire sawing process.

Preferably, L3 at the start of the resumption of the wire sawing process is reduced by between 5% and 90% relative to L1, and particularly preferably L3 is reduced by between 10% and 70% relative to L1.

In this way, the length of fresh wire during the resumption of the wire sawing process is reduced in comparison with the wire sawing process before the interruption, and the risk of deep sawing incisions being formed during the resumption is significantly reduced (FIG. 3).

In a first embodiment of the method according to the invention, the length L3 is increased (lengthened) linearly by a constant value with each cycle Z, until the length L1 of the forward movement phase WF1 before the interruption is reached again. Preferably, the length L3 is lengthened by 1 to 40%, particularly preferably by 2 to 20%, of the length L1 with each cycle, until the length L3 is equal to the length L1.

In a second embodiment of the method according to the invention, the length L3 is increased (lengthened) nonlinearly with each cycle, until the length L1 before the interruption is reached again. Preferably, the length L3 is lengthened by 1 to 40%, particularly by 2 to 20%, relative to the length L3 in the first cycle after the resumption, until the length L3 is equal to the length L1.

In a third embodiment of the method according to the invention, the length L3 is increased linearly or nonlinearly with every other cycle, or another arbitrary cycle number, until the length L1 before the interruption is reached again. Preferably, the length L3 is lengthened by 1 to 40%, particularly by 2 to 20%, relative to the length L3 in the first cycle after the resumption, until the length L3 is equal to the length L1.

The number of cycles of the method according to the invention for resuming an interrupted wire sawing process, until the cycle in which L3=L1 (normal operation), depends on the respective embodiment and on the respective lengthening of the length L3.

Preferably, the number of cycles before the normal operation is reached is at least 12, particularly preferably at least 8 cycles.

Independently of the aforementioned embodiments, the wire length L4 wound back in the method according to the invention during the backward movement phase WB4 of the cycle Z may be equal to or initially different from the length L2.

The length L4 is shorter than L3, so that, depending on the embodiment, a defined length L(new) (L(new)=L3 minus L4) of fresh wire is introduced into the wire web 4 with each sawing cycle, every other sawing cycle or another arbitrary cycle number Z, in order to minimize the wire wear.

If the wire length L4 in the wire backward phase WB4 is initially different from the length L2, the length L4 preferably corresponds to a fixed fraction of L3. In this case, the length L4 becomes somewhat greater with every sawing cycle, every other sawing cycle or an arbitrary number of sawing cycles, until the length L4 corresponds to the length L2 before the interruption of the wire sawing process.

If, for example, the length of L3 is 150 m in the first cycle WF3-1 and L3=200 m in the second cycle WF3-2, then the backward winding length L4 of the sawing wire may be 75 m in the first cycle WB4-1 and 100 m in the second cycle WB4-2.

Particularly preferably, the length L4 is equal to the length L2, that is to say the length of the wire wound back is the same both when resuming the interrupted sawing process and in the regular sawing process. In this embodiment, the wire length L4 wound back remains constant, while the wire length L3 wound forward becomes greater, or is lengthened, in the next or next but one sawing cycle or after an arbitrary number of sawing cycles, until L3=L1.

The speed v or v', respectively, of the sawing wire, that is to say the speed with which the sawing wire is wound forward or back in the time interval t1 to t2 or t3 to t4 during the method according to the invention, is preferably 5 to 20 m/s, particularly preferably 10 to 15 m/s.

Preferably, the speed v with which the sawing wire is moved forward in the time interval t1 to t2 is equal to the speed v' with which the sawing wire is moved backward in the time interval t3 to t4 (FIG. 2a).

Likewise preferably, the speed v with which the sawing wire is moved forward in the time interval t1 to t2 is not equal to the speed v' with which the sawing wire is moved backward in the time interval t3 to t4.

When the resumption of the interrupted sawing process is completed, that is to say L3=L1 and optionally L4=L2, the sawing of the workpiece is continued directly with the wire sawing cycles and the speed of the sawing wire which were set before the interruption.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, 13 and C.

What is claimed is:

1. A method for resuming an interrupted process for sawing a workpiece into a multiplicity of wafers using a wire saw, the wire saw including a sawing wire which spans a wire web including a plurality of wire sections arranged in parallel, the sawing wire being unwound from a feed spool with a forward movement and guided over at least one rotatable deflection pulley into the wire web, leaving the wire web via at least one further rotatable deflection pulley, and being wound onto a take-up spool, the interrupted process, before the interruption, including alternately moving the sawing wire in defined time intervals forward by a first length L1 and backward by a second length L2, the method for resuming the interrupted process comprising:

advancing the wire web into existing sawing kerfs of the workpiece with a forward movement of the sawing wire with a first speed v1 and in the presence of a liquid sawing medium until the wire web or workpiece has reached a position corresponding to the interruption of the wire sawing process and the sawing wire comes to a stop;

alternately moving the sawing wire in defined time intervals by a forward movement having a third length L3 with a speed v and a backward movement having a fourth length L4 with a speed v', the fourth length L4 being less than the third length L3 and the forward and backward movement corresponding to a cycle, and increasing the wire length unwound during the forward movement until the third length L3 corresponds to the first length L1 of the forward movement before the interruption.

2. The method as claimed in claim 1, wherein the increasing the wire length unwound during the forward movement is carried out on each forward movement, on every other forward movement, or after an arbitrary number of forward movements.

3. The method as claimed in claim 1, wherein the length L3 is increased linearly or nonlinearly with each cycle, every other cycle or after an arbitrary number of cycles, until the length L3 is equal to the length L1 before the interruption.

4. The method as claimed in claim 1, wherein the length L4 is equal to the length L2.

5. The method as claimed in claim 1, wherein the length L4 is shorter than L2 and the length L4 is increased linearly or nonlinearly with each cycle, every other cycle or after an arbitrary number of cycles, until the length L4 is equal to the length L2.

6. The method as claimed in claim 1, wherein the length L3 increases by 1 to 40% with each cycle, every other cycle or after an arbitrary number of cycles, until the length L3 is equal to the length L1 before the interruption.

7. The method as claimed in claim 1, wherein the length L3 in a first of the cycles corresponds to between 5 and 90% of the length L1.

8. The method as claimed in claim 1, wherein the speed v with which the wire is moved forward is equal to the speed v' with which the wire is moved backward.

9. The method as claimed in claim 1, wherein the speed v with which the wire is moved forward is not equal to the speed v' with which the wire is moved backward.

* * * * *